W. MARKY.
BRAKE MECHANISM FOR RAILWAY CARS.
APPLICATION FILED JAN. 3, 1916.
1,242,360.
Patented Oct. 9, 1917.
2 SHEETS—SHEET 1.
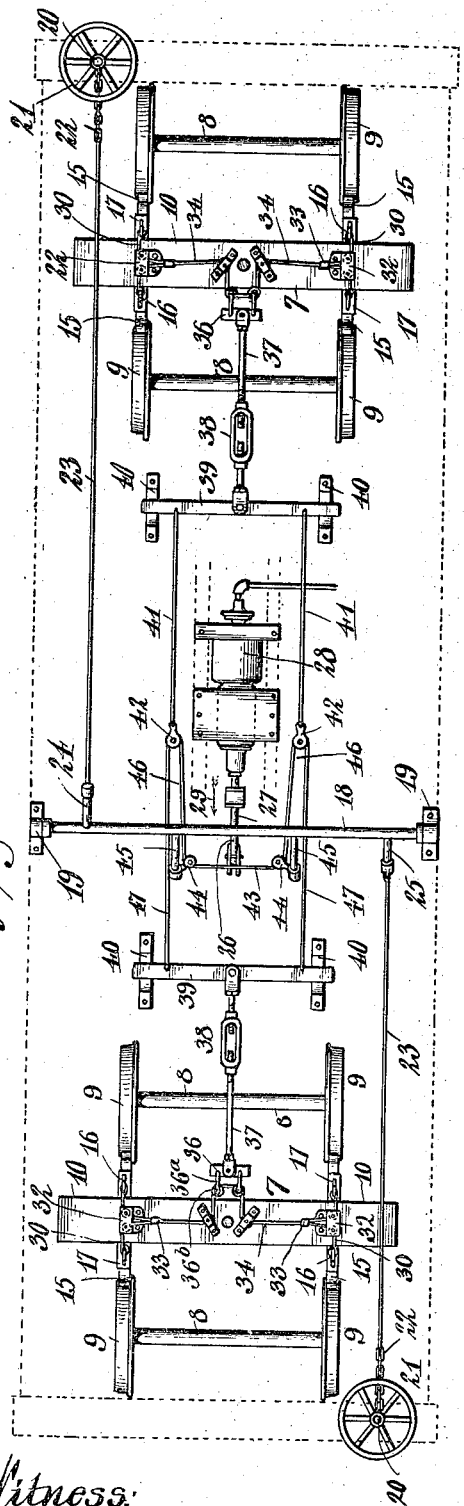
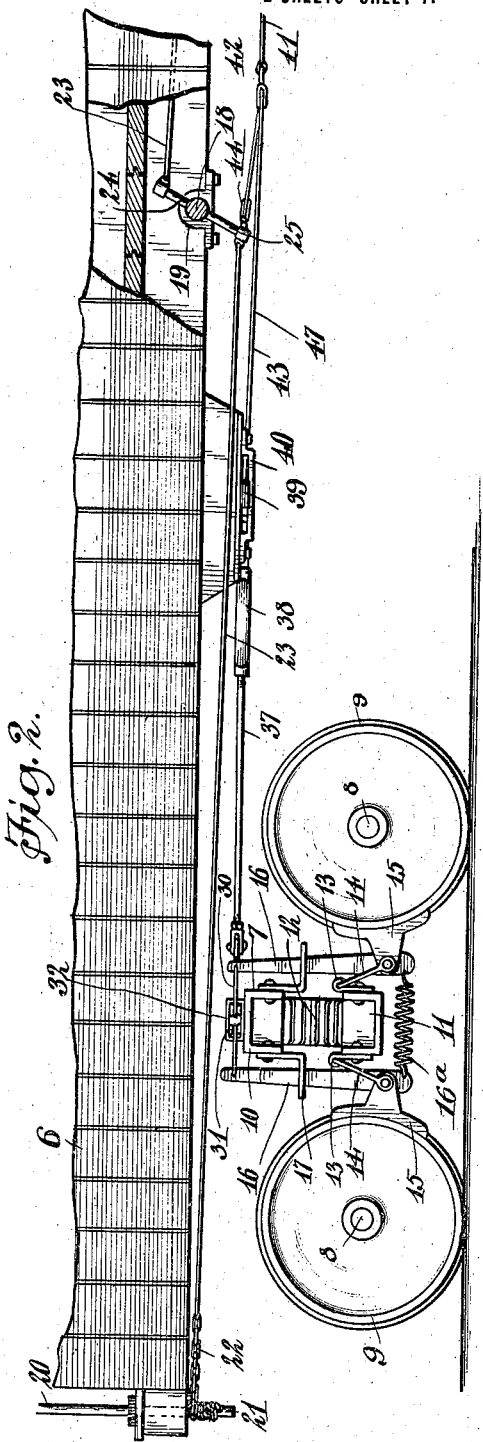
William Marky, Inventor

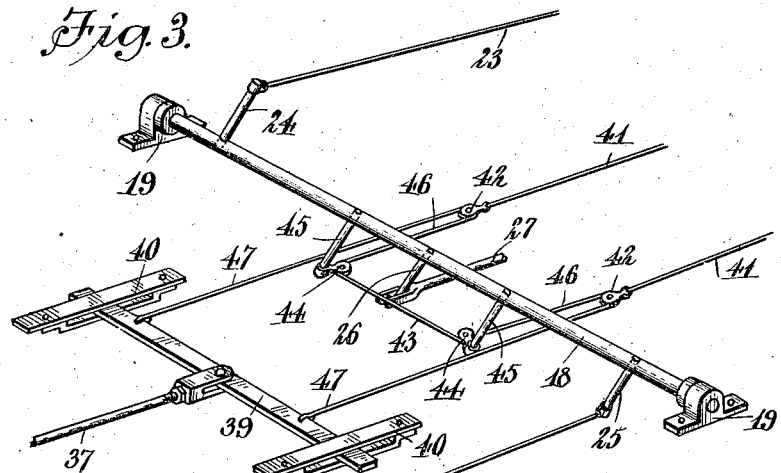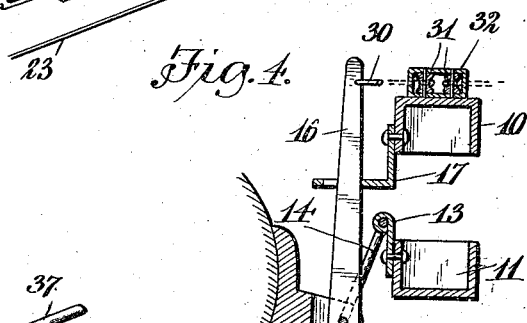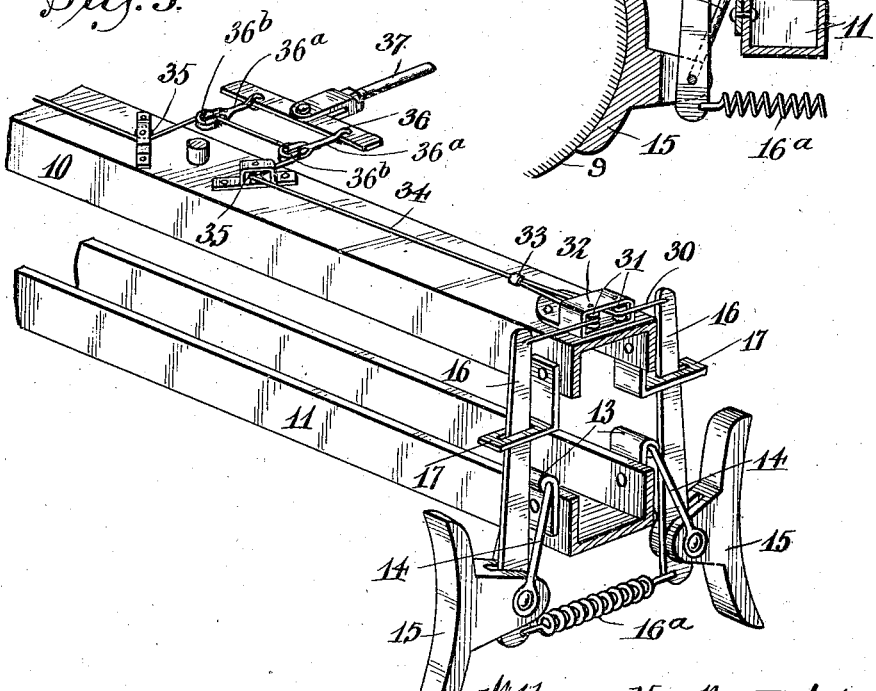

UNITED STATES PATENT OFFICE.

WILLIAM MARKY, OF BUFFALO, NEW YORK.

BRAKE MECHANISM FOR RAILWAY-CARS.

1,242,360.        Specification of Letters Patent.        Patented Oct. 9, 1917.

Original application filed June 3, 1915, Serial No. 31,900. Divided and this application filed January 3, 1916. Serial No. 69,966.

*To all whom it may concern:*

Be it known that I, WILLIAM MARKY, a citizen of the United States, residing at Buffalo, in the county of Erie and State of New York, have invented certain new and useful Improvements in Brake Mechanism for Railway-Cars, of which the following is a specification.

My invention relates to brake mechanism for railway cars.

The object of my invention is to provide means for automatically increasing or diminishing the pressure of the brake shoes against the wheels in proportion to the superposed weight carried by the trucks of the car, and in proportion to the momentum of the car.

To this end the invention consists in the combination, arrangement, and construction of parts to be hereinafter described and particularly pointed out in the subjoined claims.

This invention is a division of my application for brake mechanism for railway cars filed June 3, 1915, Serial No. 31,900.

In the drawings,—

Figure 1 is a plan view of the trucks of a car equipped with my improved brake mechanism, the body of the car being shown in dotted lines.

Fig. 2 is a side elevation of a portion of the car showing the brake mechanism at one end thereof, and the connection of the same with the central actuator.

Fig. 3 is a detached perspective view of a portion of the brake mechanism showing the means for actuating the several brake shoes simultaneously.

Fig. 4 is a sectional elevation showing one of the brake elements, the manner of supporting and fulcruming the same, with details of adjacent parts.

Fig. 5 is a sectional perspective view showing adjacent brake levers spring-connected and supported by the spring-plank member and pivotally applied to the bolster.

Referring now to the drawings in detail, similar numerals of reference refer to similar parts in the several figures.

The reference numeral 6 designates the car body supported on the usual trucks 7 at opposite ends of the car. In the particular form of car shown, each truck has two car wheel axles 8, on each of which a pair of car wheels 9 is mounted. These axles are journaled in suitable boxes (not shown) which form part of the truck, it being thought necessary to disclose only so much of the truck as is intimately connected with the brake mechanism.

I have shown each truck provided with a bolster 10, the usual spring-plank member 11 beneath the bolster, and the springs 12 between the two which yield in proportion to the weight carried by the car, as is common in car construction. These springs may be of any well known type and may be secured in any practicable manner. In order to travel over curved portions of a track, the trucks are of course pivotally secured to the body of the car by means of the usual king bolt, and the bolster is provided with the usual truck center plate, with which coöperates the body center plate and through both of which and the bolster a king bolt is passed, all of which is well known in car construction.

In order to clearly disclose the operation of the parts embodied in this invention, I have shown brake actuating-mechanism, which is somewhat different from the brake actuating-mechanism disclosed in my copending application, above referred to, but as the actuating-mechanism forms no part of my present invention, it is merely selected as one of many forms with which my invention may coöperate.

In this application, by the term "brake actuating-mechanism" I mean that portion of the mechanism between the brake levers and the prime mover, either the piston of the air brake cylinder or either of the brake shafts at opposite ends of the car.

At each end of the spring-plank member 11 of each truck and at opposite sides thereof, I provide brackets or carriers 13 to which are pivotally secured supporting links 14 having brake shoes 15 pivotally attached thereto, said shoes being adapted to be moved toward and from the treads of the car wheels by means of brake levers 16 which are also secured at or near their lower ends to said brake shoes, preferably by means of the same pivots which fasten the brake shoes to said supporting links. In the particular form of truck shown there are two brake shoes between the two wheels at each side of a truck, and it may be said that the brake shoes are thus paired, also the supporting links and brake levers associated therewith.

The brake levers extend upwardly from their pivotal points of connection with the brake shoes and pass loosely through slotted brackets 17 fastened to opposite sides of the bolster 10. In the drawings, I have shown four pairs of brake shoes, each pair being capable of action independently of the other and the brake levers of these brake shoes are actuated by brake actuating mechanism, including a central actuator in the form of a rock-shaft 18 and intermediaries to be presently described. The lower ends of the brake levers have opposite ends of a retractile spring 16ª secured thereto so that the brake shoes are normally retained out of contact with the wheels 9.

The rock-shaft 18 is positioned between the two trucks of the cars and arranged transversely, it being suitably journaled in bearings 19 fastened to the car body in any practicable manner. At each end of the car is a vertically-disposed brake shaft 20 having secured to its upper end a hand brake wheel 21, and to the lower end of each of said shafts a brake-shaft chain 22 is secured, said chains being directed inwardly toward the center of the car and having their inner ends connected to brake-shaft connecting rods 23, the inner extremities of said rods being attached to arms 24, 25, respectively, extending from the rock-shaft 18. Said arms are oppositely directed so that the rock-shaft may be actuated independently by the brake shafts at either end of the car. Said rock-shaft has also an arm 26 extending therefrom which has pivotal connection with the piston rod 27 extending from an air-controlled piston within a cylinder 28. Said cylinder, the piston therein, and the piston rod 27 form part of any air brake system capable of being controlled by the engineer within the cab of a locomotive drawing the train.

In the system shown, the piston in the cylinder 28 is moved outwardly or in the direction of the arrow 29 in Fig. 1, by air-pressure, and when thus actuated the rock-shaft is caused to rotate in the same direction as when actuated by either of the brake-shafts 21 at opposite ends of the car. The piston within the cylinder 28 is moved inwardly to normal position by means of a spring, or otherwise, after being relieved of pressure.

The intermediaries attached to the rock-shaft 18 include compensating mechanism so that the rocking movement of said shaft is imparted to the various brake levers to exactly equal degrees, thus causing the brake shoes 15 to exert pressure against the treads of the car wheels with equal force or power, regardless of whether the car is traveling in a straight line or over a curved portion of the track. These intermediaries may comprise cables, chains or rods, or a combination of such elements, as may be found desirable.

In the particular construction disclosed I have secured to one of each pair of brake levers 16, one of the ends of cables or chains 30, and these are passed around rollers or sheaves 31 arranged within a housing 32 secured to the top of the bolster. The opposite ends of these cables or chains are attached at 33 to a single cable, chain or other flexible element 34. Arranged adjacent each bolster 10 parallel therewith is a short transversely-disposed bar 36, and each of these bars has pivotally connected thereto centrally between its ends a rod 37 capable of being shortened or lengthened by means of a turn buckle 38. The opposite end of each rod 37 is pivotally connected to a transversely-disposed slide bar 39 guided for movement in guide brackets 40 secured to the underside of the car. Fastened to each of the transversely-disposed bars 36 at opposite sides of its pivotal connection with its coöperating rod 37 are two clevises 36ª having cable sheaves 36ᵇ rotatably arranged therein.

The single cable, chain or other flexible element 34 is passed around the sheaves 36ᵇ and are directed from said sheaves to and around rollers or sheaves 35 rotatable in housings secured to the top of the bolster adjacent to and at opposite sides of the king bolt thereof. From said last-mentioned rollers or sheaves the cable is directed transversely along the top of the bolster and its opposite ends attached to the cables or chains 30, as above stated. To the slide bar 39 at one end of the car I secure cables, chains or other flexible elements 41 near opposite ends of said bar and direct the same inwardly, and to the inner ends thereof pulleys 42 are secured.

A cable 43 is passed through pulleys 44 secured to a pair of arms 45 extending from the central actuator 18, said cable being directed transversely from one pulley to the other, thence lengthwise of the car, as at 46, to the pulleys 42 and from said pulleys 42 they are returned in two stretches 47 for connection to the slide bar 39 at the opposite end of the car.

By reason of the cables, chains or other flexible connections 41, 43 being passed around the pulleys 42, 44, the cables accommodate themselves in pulling power to the direction of the track over which the car may be passing and consequently the pressure or power of the brake shoes are equalized at all wheels of both trucks.

By reason of the brake levers 16 being passed through slots in the brackets 17, in which they are fulcrumed, the bolsters 10 may rise or lower independent of said levers, thus bringing the fulcrum points of the levers closer to or farther from the brake shoes in exact accordance with the weight of the car. For this reason the braking power is increased or diminished according to the weight of the car or the weight carried by the car; and also according to the momentum of the car after the brake shoes are first brought into contact with the wheels. It, of course, is understood that the momentum of a heavy car is greater than that of a light car, due to the increased adhesion of the wheels to the rails, and consequently in a train consisting of light and heavy cars the braking power of the brakes of each car is substantially such as is required to stop all the cars of a train within substantially equal distances without causing them to slide and with the least possible jarring. In brake mechanisms now constructed, the braking power applied to the wheels of the light weight cars of a train is substantially the same as applied to the wheels of heavier cars, resulting in the light weight cars being suddenly stopped, while the heavier cars, due to their increased momentum, continue to travel along the tracks causing jarring of the cars and slipping of the wheels of the lighter cars along the rails, all of which is fully understood by those skilled in the art to which this invention relates.

With the use of the brake actuating mechanism shown, or any brake actuating mechanism capable of being secured to the upper end of the brake levers to draw the levers of each pair toward each other, my invention will be clearly understood, particularly since I have explained the connection of the several parts of the actuating mechanism shown so that the movement of the central actuator 18 will be imparted to the brake levers in a uniform manner.

It is of course understood that the brake levers may be arranged otherwise than herein shown so long as provision is made for changing the leverage of said levers, for the purpose stated.

Having thus described my invention, what I claim is,—

1. In a brake mechanism for cars, the combination with a truck having a bolster and a spring-plank member, brake shoes adapted to bear against the wheels of said truck, a supporting link for each brake shoe pivotally secured to said spring-plank member, brackets secured to the bolster of said truck and having slots therein, brake levers passed through the slots of said brackets and fulcrumed therein, said levers acting against said brake shoes, and means for actuating said brake levers.

2. In a brake mechanism, the combination with a truck having a bolster, springs carrying said bolster and a spring-plank member supporting said springs, brake shoes connected to said spring-plank member, slotted brackets connected to said bolster, and brake levers connected to said brake shoes and extending upwardly through said slotted brackets, said levers being fulcrumed against one of the walls of the slots of said brackets and being adapted to have their fulcrum points change automatically as said bolster moves toward or from said spring-plank member.

3. In a brake mechanism, the combination with a truck having two members relatively movable in a vertical plane, brake shoes carried by one of said members, brake levers for actuating said brake shoes each having a changeable fulcrum point on the other member, and means for actuating said brake levers.

4. In a brake mechanism, the combination with a truck having two members relatively movable in a vertical plane, brake shoes carried by one of said members, slotted brackets secured to the other member, brake levers extending through said slotted brackets and adapted for actuating said brake shoes, and means for actuating said brake levers.

5. In a brake mechanism, the combination with a truck having two members arranged one above the other and relatively movable in a vertical plane, brake shoes connected to one of said members, slotted brackets connected to the other member, and brake levers connected to said brake shoes and extending vertically therefrom through said slotted brackets, said levers being fulcrumed against one of the walls of the slots of said brackets and being adapted to have their fulcrum points change automatically as said members are moved relatively, as described.

6. In a brake mechanism, the combination with a truck having two members arranged one above the other, springs interposed between said members and supporting the upper member, links pivotally connected to one of said members, brake shoes pivotally connected to said links, slotted brackets connected to one of said members, brake levers pivotally connected to said brake shoes and extending through said slotted brackets, and means for actuating said brake levers.

7. In a brake mechanism, the combination with a truck having two spaced members and springs interposed between said members so that one may move in a vertical plane with respect to the other, one of said members having brake-lever fulcrum points, brake shoes connected to the other member, brake levers attached to said brake shoes and adapted for changing contact with said fulcrum points, and means for operating said brake levers.

In testimony whereof I affix my signature.

WILLIAM MARKY.

Copies of this patent may be obtained for five cents each, by addressing the "Commissioner of Patents, Washington, D. C."